United States Patent [19]

Püntener

[11] Patent Number: 4,836,827
[45] Date of Patent: Jun. 6, 1989

[54] TRIS-AZO BLACK OR GREY DYES FOR LEATHER OR PELTS

[75] Inventor: Alois Püntener, Rheinfelden, Switzerland

[73] Assignee: Ciba-Geigy Corporation, Ardsley, N.Y.

[21] Appl. No.: 150,346

[22] Filed: Jan. 29, 1988

[30] Foreign Application Priority Data

Feb. 10, 1987 [CH] Switzerland ............................ 489/87

[51] Int. Cl.[4] ............................ D06P 3/32; D06P 1/39; C09B 35/46; C09B 31/16
[52] U.S. Cl. ............................................ 8/437; 8/522; 8/681; 8/687; 8/917; 8/918; 8/924; 8/926; 8/928; 534/809; 534/815
[58] Field of Search ............................ 8/437, 681, 687; 534/815

[56] References Cited

U.S. PATENT DOCUMENTS

| | | | |
|---|---|---|---|
| 3,840,514 | 10/1974 | Sailer et al. | 534/567 |
| 3,917,887 | 11/1975 | Stiller | 427/343 |
| 4,097,467 | 6/1978 | Wicki | 568/567 |
| 4,285,860 | 8/1981 | Hansen et al. | 534/796 |
| 4,468,348 | 8/1984 | Wicki | 534/614 |

FOREIGN PATENT DOCUMENTS

| | | |
|---|---|---|
| 185748 | 10/1980 | Czechoslovakia . |
| 49-039619 | 4/1974 | Japan . |
| 51-023380 | 2/1976 | Japan . |
| 55-144067 | 11/1980 | Japan . |
| 626907 | 12/1981 | Switzerland . |
| 820199 | 9/1959 | United Kingdom . |

Primary Examiner—A. Lionel Clingman
Attorney, Agent, or Firm—Wenderoth, Lind & Ponack

[57] ABSTRACT

The compounds of the formula (1) given in claim 1 are suitable for use as dyes for dyeing a wide range of textile and non-textile materials and in particular for dyeing leather and pelts.

15 Claims, No Drawings

TRIS-AZO BLACK OR GREY DYES FOR LEATHER OR PELTS

The invention relates to novel polyazo dyes, the preparation thereof and the use thereof for dyeing a wide range of textile and non-textile materials, in particular leather.

The invention accordingly provides compounds of the formula

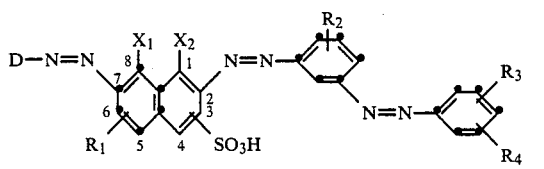

in which
D is the radical of a diazo component,
one of the radicals $X_1$ and $X_2$ is hydroxyl and the other radical is amino,
$R_1$ is hydrogen or sulfo,
$R_2$ is hydrogen, halogen, $C_1$–$C_4$alkyl, $C_1$–$C_4$alkoxy, sulfo or carboxyl, and
$R_3$ is hydroxyl, amino, N-mono- or N,N-di-$C_1$–$C_4$alkylamino, phenylamino, o-, m- or p-$C_1$–$C_4$alkylphenylamino, carboxymethylamino, $C_1$–$C_4$alkoxy or aryloxy and $R_4$ independently has the meanings of $R_3$ or is unsubstituted or methyl-, chlorine- or nitro-substituted benzoylamino, $C_1$–$C_4$-alkanoylamino, $C_1$–$C_4$alkyl, halogen, nitro or sulfo.

The diazo radical D is derived for example from an aromatic amine of the formula $$D\text{-}NH_2 \quad (2)$$

The aromatic amine is for example a heterocyclic amine, a 1- or 2-naphthylamine or, preferably, an aminobenzene.

An aminobenzene radical D can carry one or more identical or different substituents, for example: $C_1$–$C_4$alkyl, which here and hereinafter generally comprises methyl, ethyl, n- or iso-propyl or n-, sec- or tert-butyl; $C_1$–$C_4$alkoxy, which generally is to be understood as meaning methoxy, ethoxy, n- or iso-propoxy or n-, sec- or tert-butoxy; halogen, which generally is to be understood as meaning fluorine, bromine and in particular chlorine; trihalomethyl, in particular trifluoromethyl; $C_1$–$C_4$alkylsulfonyl, in particular methyl- or ethylsulfonyl; sulfamoyl, for example -$SONH_2$ or N-mono- or N,N-di-$C_1$–$C_4$alkylaminosulfonyl; carbamoyl, for example -$CONH_2$ or N-mono- or N,N-di-$C_1$–$C_4$alkylaminocarbonyl, sulfo; nitro; cyano; carboxyl; phenoxy.

A 1- or 2-naphthylamine radical D can be unsubstituted or substituted for example by the abovementioned substituents and in particular by sulfo.

A heterocyclic amine radical D can be for example a 2-(4-aminophenyl)-benzothiazolyl radical which is unsubstituted or substituted by for example $C_1$–$C_4$alkyl and/or sulfo; this 2-(4-aminophenyl)benzothiazolyl radical is preferably unsubstituted or substituted in the benzothiazole part by sulfo and/or methyl.

Examples of particularly preferred heterocyclic parent amines for the diazo radical D are: 2-(4-aminophenyl)benzothiazole, 2-(4-aminophenyl)-6-methyl-7-sulfobenzothiazole, 2-(4-aminophenyl)-5- or -6-sulfobenzothiazole.

Preferably, D is an unsubstituted or halogen-, cyano-, $C_1$–$C_4$alkyl- and/or $C_1$–$C_4$alkoxy-substituted radical of an aminobenzene.

A radical D of an aminobenzene is particularly preferably substituted by one or two identical or different radicals selected from the group consisting of methyl, methoxy and chlorine.

$X_1$ is preferably hydroxyl, and $X_2$ is preferably amino.

The sulfo group is for example in the 4-position and preferably in the 3-position of the naphthalene coupling component.

$R_1$ is preferably a sulfo group which is arranged for example in the 6-position of the naphthalene coupling component.

A group of suitable compounds comprises those of formula

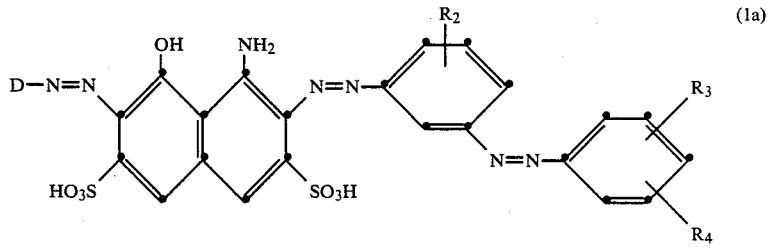

in which D, $R_2$, $R_3$ and $R_4$ are as defined above.

$R_2$ in the formulae (1) and (1a) is preferably hydrogen, methyl, methoxy, chlorine or sulfo; here the meaning of $R_2$ as hydrogen is particularly preferred.

An aryloxy $R_3$ and/or $R_4$ in the formula (1) or (1a) is for example a phenoxy radical.

A $C_1$–$C_4$alkanoylamino $R_3$ or $R_4$ is for example a propionylamino and in particular an acetylamino radical.

$R_3$ and $R_4$, independently of each other, are preferably hydroxyl, amino, phenylamino, o-, m- or p-tolylamino, carboxymethylamino, $C_1$–$C_4$alkoxy or phenoxy.

Particularly preferably, $R_3$ and $R_4$ are independently of each other hydroxyl or amino.

The radicals $R_3$ and $R_4$ are for example arranged in the ortho- or para-position and particularly preferably in the meta-position relative to each other.

Because of their good dyeing properties, preference is given to compounds of the abovementioned formula (1a) in which D is an unsubstituted or halogen-, cyano-, $C_1$–$C_4$alkyl- and/or $C_1$–$C_4$alkoxy-substituted radical of an aminobenzene, $R_2$ is hydrogen, chlorine or sulfo and $R_3$ and $R^4$ independently of each other hydroxyl, amino, phenylamino, o-, m- or p-tolylamino, carboxymethylamino, $C_1$–$C_4$alkoxy or phenoxy.

Particular preference is given to compounds of the formula (1a) in which D is a radical of an aminobenzene substituted by one or two identical or different radicals selected from the group consisting of chlorine, methyl and methoxy, $R_2$ is hydrogen and $R_3$ and $R_4$ are independently of each other hydroxyl or amino.

A particularly preferred embodiment of the present invention comprises compounds of the formula

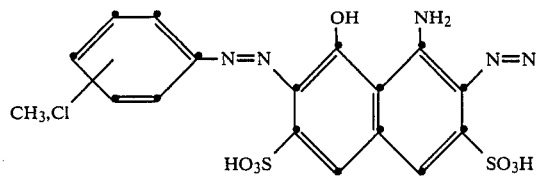
(1b)

in which $R_3$ and $R_4$ are independently of each other hydroxyl or amino.

The compounds of the formula (1) can be prepared in a manner known per se, for example by (a) diazotizing a compound of the formula

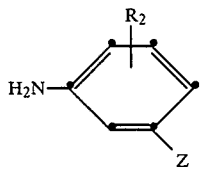
(3)

in which Z is $-NO_2$ or $-NH$-acyl and acyl is a readily detachable acid radical, for example acetyl, and coupling the diazo product onto a compound of formula

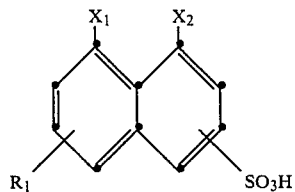
(4)

(b) coupling onto the monoazo compound obtained a diazotized amine of the formula

(2)

(c) converting in the resulting disazo compound of the formula

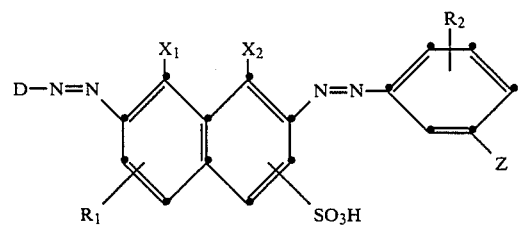
(5)

Z by reduction, if a nitro group, or by hydrolysis, if Z is NH-acyl, into an amino group, which is then diazotized, and (d) coupling the disazo compound diazotized in (c) onto a compound of the formula

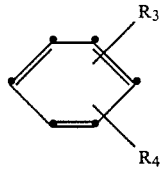
(6)

In the formulae (2) to (6), $R_1$, $R_2$, $R_3$, $R_4$, $X_1$, $X_2$ and D are subject to the definitions and preferred meanings given above.

The diazotization of the amines of the formula (3) and the coupling onto compounds of the formula (4) take place in a manner known per se in an aqueous or aqueous-organic medium, preferably at low temperatures, for example at $-5°$ to $30°$ C. The coupling can take place in an acid, neutral or alkaline medium, but is preferably carried out in an acid medium.

Likewise the diazotization of the compounds of the formula (2) and their coupling onto the monoazo compounds obtained as per reaction step (a), this coupling preferably being carried out in an alkaline medium, and also the diazotization of the compounds obtained from compounds of the formula (5) by converting Z into an amino group and coupling of the former compounds onto the compounds of the formula (6), which is preferably carried out in a neutral to alkaline medium, are effected in a manner known per se.

Setting the desired pH, if it is to be acid, can be effected by using the free acids and/or by adding mineral acids or, if the pH is to be alkaline, by adding ammonium bases or alkali metal bases, for example ammonia, lithium hydroxide, sodium hydroxide, potassium hydroxide, lithium carbonate, sodium carbonate or potassium carbonate.

The compounds of the formula (5) where $Z=NO_2$ are reduced to the corresponding amino compounds in a manner known per se using known, preferably mild, reducing agents such as alkali metal sulfides, for example sodium sulfide.

Likewise the hydrolysis of the acylamino compounds of the formula (5) to the corresponding amino compounds is carried out in a manner known per se, advantageously by heating in an aqueous-alkaline medium, the corresponding amines being obtained as salts.

Z in the compounds of the formula (5) preferably is $-NO_2$.

The compounds of the formula (1) are anionic dyes, and in general are suitable for dyeing textile and nontextile substrates which are dyeable with anionic dyes, for example for dyeing fibre material made of natural or regenerated cellulose, natural or synthetic polyamides, polyurethanes or cationically modified polyolefins, and also anodized aluminium, or leather and pelts.

The dyes according to the invention can be used advantageously for example for dyeing cellulose fleece materials, wood and paper. Suitable fibre materials are in particular cotton and natural polyamides such as wool and silk, while the synthetic fibre materials are first and foremost nylon and cationically modified polypropylene.

The compounds of the formula (1) according to the invention are preferably suitable for dyeing pelts and in particular leather, all kinds of leather, for example chrome leather, retanned leather or velour leathers from goat, sheep, cattle and pig, being suitable.

The results obtained are predominantly grey to black dyeings having good allround fastness properties; the dyes according to the invention are distinguished in particular by a very high affinity for protein materials, in particular for leather, and, what is more, do not give rise to bronzing.

The compounds of the formula (I) according to the invention are also suitable for use as constituents of inks and in particular of recording fluids for the ink-jet process.

The Examples which follow serve to illustrate the invention without limiting it thereto. Parts and percentages are by weight.

EXAMPLE 1

20.7 parts of 3-nitroaniline are introduced into 150 parts of water and diazotized with hydrochloric acid and sodium nitrite in a conventional manner, and the diazo product is coupled at an acid pH with 48 parts of 1-amino-8-hydroxynaphthalene-3,6-disulfonic acid.

After the first coupling has ended, 20.1 parts of 3-chloroaniline which have likewise been diazotized in a known manner are added; the pH of the reaction mixture in the course of this second coupling is maintained at a slightly alkaline value by addition of 30% sodium hydroxide solution. The nitrodisazo compound thus obtained is heated in the reaction mixture to 50°-55° C., and the nitro group is reduced to an amino group with the aid of an aqueous solution containing 44 parts of sodium sulfide. The aminodisazo dye is then salted out with sodium chloride in an acid medium and filtered off.

The aminodisazo dye thus isolated is again diazotized in a conventional manner with sodium nitrite and hydrochloric acid, and 12 parts of 3-aminophenol, dissolved in 150 parts of water, are then added, while the pH is held at a slightly alkaline value with 30% sodium hydroxide solution. The resulting trisazo dye is salted out with sodium chloride, filtered off and dried.

The dark powder obtained dyes leather in a black shade having good fastness properties.

EXAMPLES 2-17

Example 1 is repeated to obtain the polyazo dyes of the formula

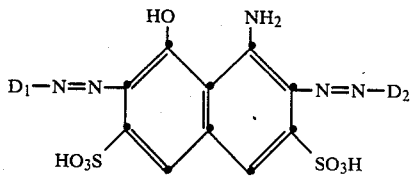

in which $D_1$ and $D_2$ are as defined in Table 1 below. Applied to leather in a conventional manner the dyes each produce a black dyeing having good fastness properties.

TABLE 1-continued

| Example No. | D₁ | D₂ |
|---|---|---|
| 6 | 2-Cl-phenyl | phenyl-N=N-(2,4-dihydroxyphenyl) |
| 7 | 2-Cl-phenyl | phenyl-N=N-(2,4-diaminophenyl) |
| 8 | 2-CH₃-phenyl | 2-CH₃-phenyl-N=N-(2-N(CH₃)₂-4-hydroxyphenyl) |
| 9 | 4-Br-phenyl | 2-CH₃-phenyl-N=N-(2-NH₂-4-hydroxyphenyl) |
| 10 | " | 2-CH₃-phenyl-N=N-(2-N(CH₃)₂-4-hydroxyphenyl) |
| 11 | 2-H₃CO-phenyl | 2-CH₃-phenyl-N=N-(2,4-dihydroxyphenyl) |
| 12 | " | 2-CH₃-phenyl-N=N-(2,4-diaminophenyl) |

TABLE 1-continued

| Example No. | D₁ | D₂ |
|---|---|---|
| 13 | naphthalene-SO₃H | H₃C-C₆H₃-N=N-C₆H₃(N(CH₃)₂)(OH) |
| 14 | " | H₃C-C₆H₃-N=N-C₆H₃(NH₂)(OH) |
| 15 | H₃C-C₆H₄- | C₆H₄-N=N-C₆H₃(NH₂)(OH) |
| 16 | H₃C-C₆H₄- | " |
| 17 | 2-CH₃-C₆H₄- | " |

EXAMPLE 18

Example 1 is repeated, except that in place of 1-amino-8-hydroxynaphthalene-3,6-disulfonic acid an equivalent amount of 1-amino-8-hydroxy-4,6-disulfonic acid is used, affording the dye of the formula

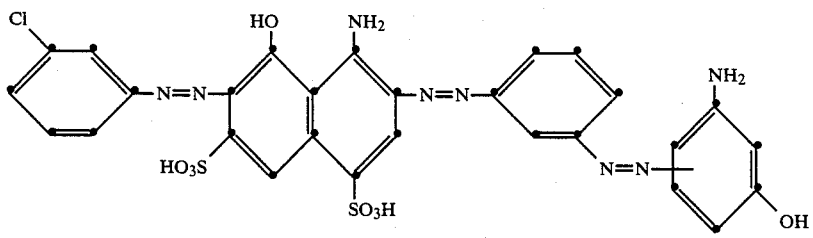

which dyes leather in a black shade having good fastness properties.

Dyeing method for leather 100 parts of clothing velour leather are drummed for 2 hours at 50° C. in a solution of 1,000 parts of water and 2 parts of 24% ammonia and are then dyed at 60° C. for 1 hour in a solution of 1,000 parts of water, 2 parts of 24% ammonia and 3 parts of the dye prepared as described in the above example 1. A solution of 40 parts of water and 4 parts of 85% formic acid is then added, and dyeing is continued for a further 30 minutes. The pieces of leather are then thoroughly rinsed and optionally treated for 30 minutes at 50° C. with 2 parts of a dicyanodiaminoformaldehyde condensation product. The result obtained is a black dyeing having good fastness properties.

What is claimed is:

1. A compound of the formula

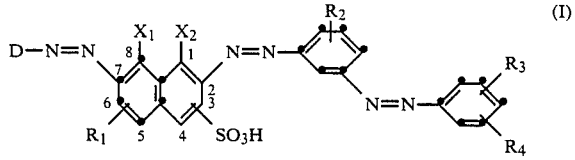

in which
D is the radical of a diazo component,
one of the radicals $X_1$ and $X_2$ is hydroxyl and the other radical is amino,
$R_1$ is hydrogen or sulfo,
$R_2$ is hydrogen, halogen, $C_1$-$C_4$alkyl, $C_1$-$C_4$alkoxy, or carboxyl, and
$R_3$ is hydroxyl, amino, N-mono- or N,N-di-$C_1$-$C_4$alkylamino, phenylamino, o-, m- or p-$C_1$-$C_4$alkylphenylamino, carboxymethylamino, $C_1$-$C_4$alkoxy or aryloxy and $R_4$ independently has the meanings of $R_3$ or is unsubstituted or methyl-, chlorine- or nitro-substituted benzoylamino, $C_1$-$C_4$-alkanoylamino, $C_1$-$C_4$alkyl, halogen, nitro or sulfo.

2. A compoud according to claim 1, wherein D is an unsubstituted or $C_1$-$C_4$alkyl-, $C_1$-$C_4$alkoxy-, halogen, trihalomethyl-, $C_1$-$C_4$alkylsulfonyl-, sulfo-, nitro-, cyano-, carboxyl-, phenoxy-, sulfamoyl- and/or carbamoyl-substituted aminobenzene radical.

3. A compound according to claim 1, wherein D is an unsubstituted or halogen-, cyano-, $C_1$-$C_4$alkyl- and/or $C_1$-$C_4$alkoxy-substituted aminobenzene radical.

4. A compound according to claim 1, wherein D is a aminobenzene radical substituted by one or two radicals selected from the group consisting of methyl, methoxy and chlorine.

5. A compound according to claim 1, wherein $X_1$ is hydroxyl and $X_2$ is amino.

6. A compound according to claim 1 of the formula

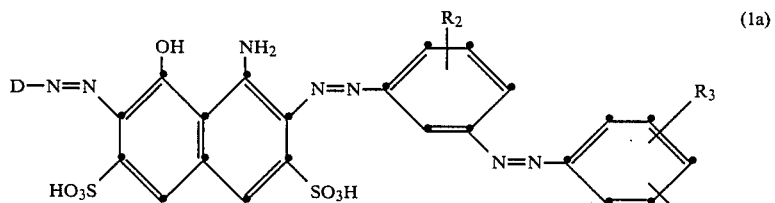

in which D, $R_2$, $R_3$ and $R_4$ are as defined in claim 1.

7. A compound according to claim 1, wherein $R_2$ is hydrogen or chlorine.

8. A compound according to claim 1, wherein $R_3$ and $R_4$ are independently of each other hydroxyl, amino, phenylamino, o-, m- or p-tolylamino, carboxymethylamino, $C_1$-$C_4$alkoxy or phenoxy.

9. A compound according to claim 1, wherein $R_3$ and $R_4$ are independently of each other hydroxyl or amino.

10. A compound according to claim 6 of the formula (1a) in which D is an unsubstituted or halogen-, cyano-, $C_1$-$C_4$alkyl- and/or $C_1$-$C_4$alkoxy-substituted aminobenzene radical, $R_2$ is hydrogen or chlorine and $R_3$ and $R_4$ are independently of each other hydroxyl, amino, phenylamino, o-, m- or p-tolylamino, carboxymethylamino, $C_1$-$C_4$alkoxy or phenoxy.

11. A compound according to claim 6 of the formula (1a) in which D is a an aminobenzene radical substituted by one or two identical or different radicals selected from the group consisting of chlorine, methyl and methoxy, $R_2$ is hydrogen, and $R_3$ and $R_4$ are independently of each other hydroxyl or amino.

12. A compound according to claim 1 of the formula

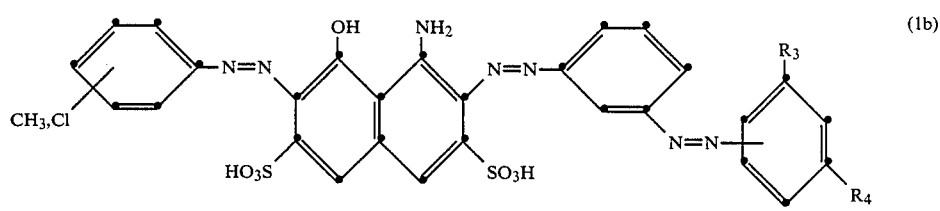

in which $R_3$ and $R_4$ are independently of each other amino or hydroxyl.

13. A process for preparing a compound of the formula (1), which comprises (a) diazotizing a compound of the formula

in which Z is $-NO_2$ or $-NH$-acyl and acyl is a readily detachable acid radical, for example acetyl, and coupling the diazo product onto a compound of formula

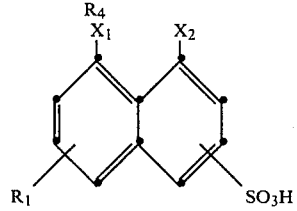

(b) coupling onto the monoazo compound obtained a diazotized amine of the formula

D-NH₂            (2)

(c) converting in the resulting disazo compound of the formula

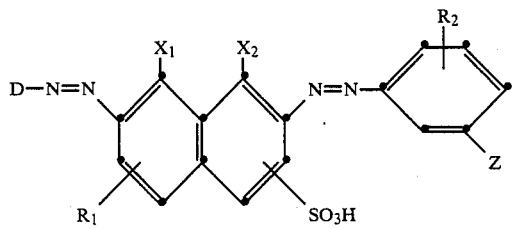 (5)

Z by reduction, if a nitro group, or by hydrolysis, if Z is NH-acyl, into an amino group, which is then diazotized, and (d) coupling the disazo compound diazotized in (c) onto a compound of the formula

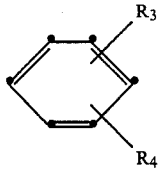 (6)

where $R_1$, $R_2$, $R_3$, $R_4$, $X_1$, $X_2$ and D in the formulae (2) to (6) have the meanings defined in claim 1.

14. In a method for the dyeing of a fiber material made of natural or of regenerated cellulose, natural or synthetic polyamides, polyurethanes or cationically modified polyolefins, anodized aluminum or pelts and leather, the immprovement wherein a compound as defined in claim 1 is employed as the dye.

15. A method according to claim 14 wherein pelts or leather are dyed.

* * * * *